Jan. 18, 1966     D. J. FREEMAN     3,229,521
ORBITING VEHICLE POSITION SENSOR
Filed Jan. 29, 1962     2 Sheets-Sheet 1
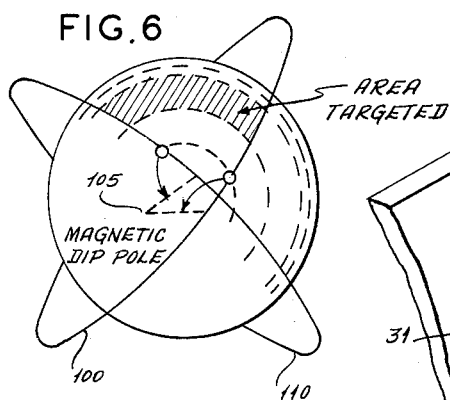
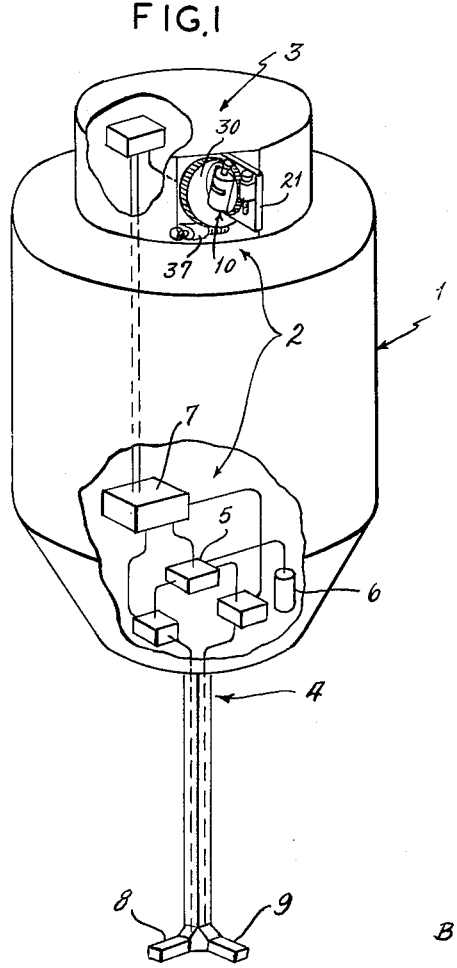
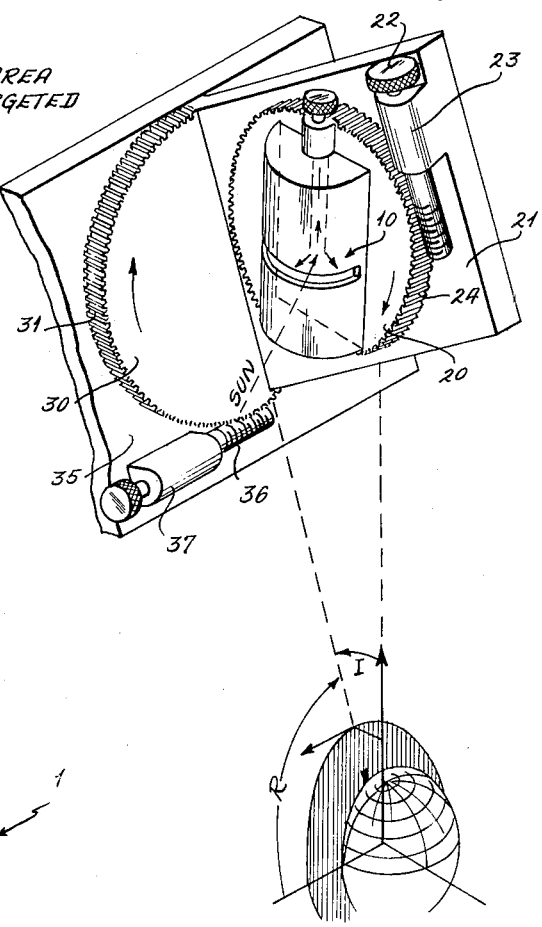
INVENTOR:
DAVID J. FREEMAN
BY *Sutherland, Potl & Taylor*
ATTORNEYS, Jan. 18, 1966 D. J. FREEMAN 3,229,521
ORBITING VEHICLE POSITION SENSOR
Filed Jan. 29, 1962 2 Sheets-Sheet 2
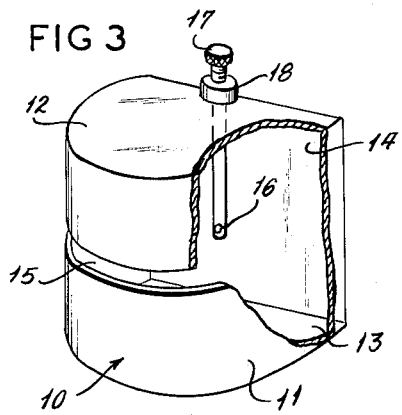
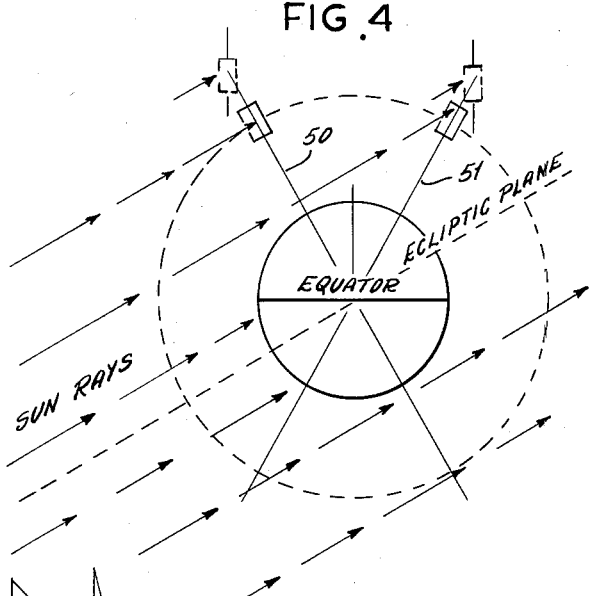
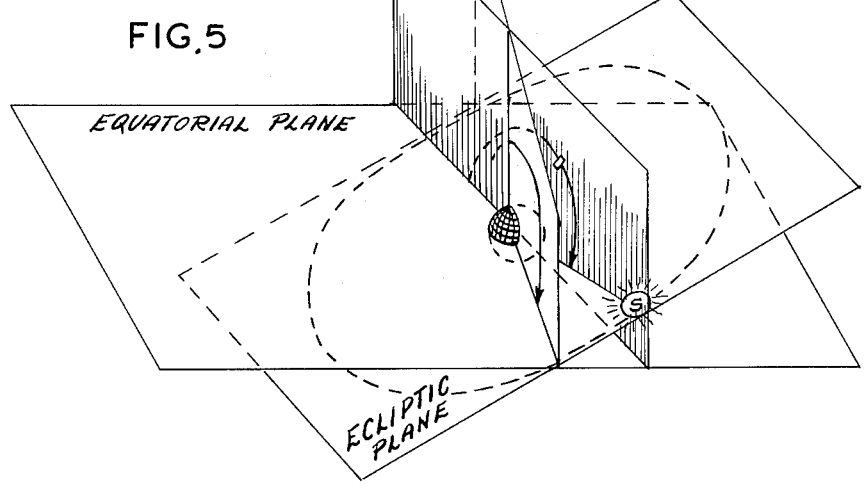
INVENTOR
DAVID J. FREEMAN
BY *Sutherland, Colt & Taylor*
ATTORNEYS.

3,229,521
ORBITING VEHICLE POSITION SENSOR
David J. Freeman, Florissant, Mo., assignor to Emerson Electric Co., a corporation of Missouri
Filed Jan. 29, 1962, Ser. No. 169,357
14 Claims. (Cl. 73—178)

This invention relates to a sensor which has particular use in determining whether an orbiting vehicle such, for example, as an unmanned satellite, has reached a predetermined position with respect to the earth.

There are many reasons why it is desirable to have a simple sensing system by which predesignated latitude and longitude boundaries can be determined. For example, in order to conserve film in an observation satellite, when the area desired to be observed is a limited one, it is desirable to have some simple means for energizing the camera while the satelite is traversing the desired area, and to de-energize it for the rest of the time.

One of the subjects of this invention is to provide a simple sensing device, which may have no moving parts, and is contained within an orbiting vehicle itself, by which is sensed whether the vehicle is in a predetermined position, and which can then be used to put the information to use.

In accordance with this invention, generally stated, a simple latitude sensor is mounted in an orbiting vehicle such as a satellite, one axis of which, in flight, remains aligned with the local vertical (radially oriented with respect to the earth), by means of a suitable attitude reference device, such, for example, as a horizon scanner (see "Attitude Reference Devices for Space Vehicles," Institute of Radio Engineers proceedings, April 1960, page 765 et seq.) and the other two axes of which remain aligned with the instantaneous flight path vector and with the orbit's angular momentum vector respectively. The latitude sensor is energized by radiation from the sun when the satellite reaches a predetermined latitude. Preferably, the energizing of the latitude sensor triggers a longitude sensing device. A signal from the latter is preferably compared with a stored response, to determine whether the satellite has reached a predetermined longitude at the given latitude.

The latitude sensor consists essentially of a chamber with an optical slit in it, and one or more radiation sensitive cells within the chamber, so positioned that radiation from the sun coming through the optical slit, falls, with the proper orientation of the slit and cells, on the cells. The term "optical slit" is used herein to mean an elongated narrow area transparent to the radiation to which the cells are sensitive. It may be a simple opening, or it may be a quartz window or the like, depending upon what and how much radiation is to be utilized. Similarly, the "chamber" may be hollow, or it may be filled with some radiation- transparent medium. While normally, it is expected that the radiation sensitive cells will respond to visible light and the chamber will be hollow, the cells may be chosen to respond to radiation of the sun which is not visible, at least to the human eye.

Preferably, and this is highly advantageous, the chamber is adapted to be oriented in such away that, at the desired latitude, the optical slit is parallel to the equatorial plane of the earth, or, to put it another way, the chamber is oriented with respect to the plane of the slot, on a polar axis, aligned with the North Star. Under these circumstances, adjustment for hold time when the satellite vehicle is launched, and for its nodal precession caused by the earth's oblateness can be readily accomplished before launching, and, for the most part, will not have to be made at all, because this peculiar orientation of the chamber permits of a wide tolerance of hold time and nodal precession, without adjustment.

The longitude sensing means may be magnetometers, set at right angles to one another, of the general type well known to the art, by which the angular relationship between the satellite and a magnetic dip pole, which can be either the magnetic North or South Pole, can be determined. Actually, the magnetometers in the device of this invention are not used to determine various absolute angular relationships, but only to determine whether a particular angular relation has in fact been reached at the time the magnetometer signal is compared with a preset reference. When the magnetometer signal and the preset reference coincide, the satellite is, or in a known length of time will be, over the observation area.

The magnetometer system need not be adjusted for rotation of the earth due to hold time, or for the declination of the sun, since the relative angular relationship of the satellite and the earth is not changed thereby. The preset reference will depend to some extent on the inclination of the orbit. The latitude sensor however, being dependent upon the angular relationship of the chamber and the sun, must be adjusted to account for hold time, precession of the orbit nodes, decliniation of the sun, and the orbit. In the preferred embodiment shown, all of these adjustments are made before launching, by simple rotational movement ,which can be accomplished manually or mechanically.

The adjustment for declination, in the preferred embodiment in which all adjustment is made before launching, is a compromise, in which the accuracy is determined timewise, normally to increase to the half life of the experiment and decrease at a known rate thereafter. The accuracy will depend chiefly upon the time of year at which the launch is made and the duration of the experiment. At the summer and winter solstices, even with a relatively long half life, e.g., twenty days, there will be substantially no error caused by change in the sun's declination. At the vernal and autumnal equinoxes, an error of almost a degree will be caused by the sun's change in decliniation, in a half-life of five days. At any other launch time, the amount of error, as a function of time, will be intermediate the two extremes of solstice and equinox.

In the drawing, FIGURE 1 is a somewhat schematic view in perspective of a satellite equipped with one embodiment of this invention;

FIGURE 2 is a somewhat schematic view in perspective of the latitude sensing part of the sensor shown in FIGURE 1, showing its relation, in orbit, to the earth;

FIGURE 3 is a view in perspective, partly broken away of the chamber of the latitude sensing part shown in FIGURE 2;

FIGURE 4 is a diagrammatic view illustrating the change of angular relationship between the chamber and the sun's rays with movement of the satellite (1) in polar orbit and (2) in canted orbits with respect to the sun;

FIGURE 5 is a diagrammatic view illustrating various planes indicated by lines in FIGURE 4; and FIGURE 6 is a diagrammatic view illustrating the basis of operation of the longitude sensing part of the sensor of this invention.

Referring now to the drawing for an illustrative embodiment of this invention, reference numeral 1 indicates a stabilized satellite provided with a location sensor 2 of this invention. The location sensor 2 is made up of a latitude sensor 3, a longitude sensor 4 and a correlating and reference (memory) device 5, all connected to a power source 7.

The longitude sensor 4 includes magnetometer probes 8 and 9, and suitable electronic circuitry, indicated only diagrammatically. Both the longitude sensor and the correlating and reference device 5 are of the character of devices well known in the art at the present time, so that as elements per se, they do not form a part of this invention. Devices of this character, but with somewhat greater refinement than is necessary in the present application, are shown in U.S. patents to Emerson, No. 2,749,506 and Smith, No. 2,847,642. The latitude sensor 3, includes a chamber 10 with a semi-cylindrical wall 11, a top 12, a bottom 13 and a back wall 14. The semi-cylindrical wall 11 has an optical slit 15, the upper and lower defining edges of which are in a plane parallel with the top 12 and bottom 13, in the embodiment shown.

Inside the chamber 10 on the back wall 14, is radiation sensitive element 16. A vertical declination adjusting screw 17, journaled in a boss 18, projects at right angles to the slit 15, and is connected to the element 16 in such a way as to accomplish the adjustment of the element 16 in a direction at right angles to the plane of the slit 15.

Referring now particularly to FIGURE 2, the chamber 10 is, in this illustrative embodiment, mounted on a circular plate 20, in such a way that the plane of the center line of the slot is diametric with respect to the plate 20 and perpendicular thereto. The plate 20 is rotatably mounted on a bracket 21. An orbit-co-inclination worm 22, journalled in a boss 23 on the bracket 21 engages teeth 24 on the perimeter of the plate 20, whereby the plate 20 can be rotated about its central axis.

The bracket 21 is mounted diametrically on and at right angles to a flat disk 30, which, in turn, is rotatably mounted on a stand 35. A latitude adjustment worm 36 journalled in a boss 37 on the stand 35 meshes with teeth 31 on the periphery of disk 30, whereby the disk 30 may be rotated about its central axis. In operation, as will become apparent hereinafter, this latitude adjustment is about an axis parallel to the orbit angular momentum vetor.

It will be assumed first that the meeting edge of the bracket 21 and disk 30 is initially parallel to the satellite axis, and the plane of the slit 15 perpendicular thereto. Referring now to FIGURE 4, and the satellite as shown in solid lines, it can be seen that if the satellite were shot at an exactly predetermined time, in a true polar orbit, indicated by the dotted line, the sun's rays would fall upon the radiation sensitive element 16 at a latitude determined, within limits, by the adjustment of declination screw 17. If the optical slit 15 is narrow and deep, then the range of latitude adjustment which can be had with the declination screw 17 is narrowly limited. Accordingly, it is preferred to use the declination screw 17 only to adjust for the sun's declination at the experiment half life, and to use the latitude adjustment worm 36 to adjust for the desired latitude. Again, from FIGURE 4 it can be seen that, for a given position of the radiation sensitive element 16, the angle which the chamber makes with the local vertical satellite coordinate will determine the latitude at which the sun's rays will pass through the slit, and strike the radiation sensitive element.

If, instead of having a true polar orbit, the satellite orbit is canted with respect to the poles, i.e., if the solid lines 50 and 51 in FIGURE 4 are taken to be edge views of orbital planes, orbit co-inclination form 22 may be used to rotate the plate 20, hence the chamber, to a position at which, at the desired latitude, the axis of the optical slit 15 is parallel to the plane of the ecliptic.

The two adjustments described, are all that are required in the event that the satellite is launched at an exact, predetermined time, and the experiment life is sufficiently short so that precession of the nodes of the satellite is not a factor. However, the launching of a satellite can rarely be timed exactly, and the experiment life is rarely so short that the precession of the nodes of the satellite orbits is not a factor.

If, however, the latitude and orbit co-inclination adjustments are made in such a way that, at the desired latitude the axis of the chamber at right angles to the plane of the slit is directed toward the North Star, with the plane of the slit 15 parallel with the equatorial plane of the earth, premature launching, or, most commonly, delay in launching, will not introduce any first order errors due to the earth's rotation, nor will the precession of the satellite orbit nodes affect the first order accuracy of the latitude sensor. It can be seen that, since the optical slit will not be in the plane of the ecliptic at the desired latitude, but in the equatorial plane, the slit must be so formed and arranged as to permit the sun's rays to fall upon the element 16 at an angle corresponding to the declination of the sun at the particular time of year.

This is illustrated particularly in FIGURES 4 and 5. To the extent that the optical slit will accommodate the apparent rotation of the sun with respect to the element 16, no adjustment for hold time or precession need be made. In FIGURE 4, an extreme example is given, in that the orbits 50 and 51 are twelve hours of hold time apart. The slit 15 would have to encompass more than 180° to accommodate such a delay. The chamber shown in solid lines is, as has been noted, on the local satellite axis, and it is apparent that the latitude which would have been sensed in orbit 50 will not be sensed in orbit 51. However, the chambers oriented on the polar axis, shown in dotted lines, bear the same angular relationship to the sun in both orbits, and the same latitude will accordingly be sensed in both orbits.

The operation of the illustrative embodiment of the device of this invention can be understood by referring to FIGURES 5 and 6. In FIGURE 6, reference numeral 100 indicates an orbit, near but not at a 90° inclination (or 0° co-inclination), i.e., canted slightly from a polar orbit. The north magnetic dip pole is indicated by reference numeral 105. Another orbit, with the same inclination, but rotated or precessed from the orbit 100 (or the same orbit under which the earth has rotated), is indicated by reference numeral 110. It can be seen that every point on a given latitude bears a unique angular relation to the magnetic dip pole. Thus, for each different pass of the satellite, while the earth is rotating beneath it, the satellite will bear a different angular relationship to the magnetic dip pole at the same latitude.

The latitude of the satellite is sensed by the radiation sensitive element 16 by virtue of the relationship of the satellite to the sun, which, except for changing declination, as is explained hereafter, remains substantially constant. As has also been indicated heretofore, electrical characteristics defining the desired angular relationship between the satellite and the magnetic dip pole which obtain at the desired longitude are stored in the memory device 5 in the satellite prior to launch. The magnetometers in the longitude sensing device are energized in response to signal from the radiation sensitive element 16 at the same latitude on each pass of the satellite above the earth. For greatest accuracy this latitude should be the maximum attained in the orbit. The two magnetometers are oriented along the roll and pitch axes of the satellite so that they measure orthogonal components of the earth's horizontal magnetic field. The ratio of the magnitudes of these two components and their algebraic signs are sufficient to define the angle to the geomagnetic dip pole in satellite coordinates. The magnetometers thus perform the function of a compass, but, unlike a simple compass, they provide a discrete signal for every relative position of the vehicle and pole. The one situation in which this is not true does not pose a problem since the latitude at which the sensor is energized and the desired angular relationship (the stored signal) are pre-set to avoid the case in which one probe is aligned with and the other perpendicular to the pole. The outputs of the two magnetometers are compared electronically with the information stored in the memory device 5, each time the magnetometers are energized by the latitude sensor. If they fall within the limits of the stored information, the position of the satellite relative to the earth, and of its orbit, are, within certain limits of error, definitely determined. This constitutes an ability to predict specific longitudes which will attend each latitude sensed on the immediately following pass. Thus having made this one pole angle determination, it is only necessary to sense successive latitudes to know longitude. The pole angle sensor thus constitutes a longitude sensor.

When the latitude and longitude thus sensed are within the desired limits, the device 5 acts to actuate a component, such as a camera 6, of the vehicle.

It can readily be seen that if two or more sensing devices are empolyed, various additional boundaries may be determined. Thus, for example, if two latitude sensing means are provided, oriented so that their slits admit sun radiation at different latitudes, a lower and upper latitude boundary can be sensed. With three latitude sensors, one can be used to energize the magnetometers at the optimum (greatest) latitude for determining the angular relationship of the satellite to the magnetic dip pole, while the other two can act to define the desired latitude boundaries for observation or the like.

The circuitry of the latitude and longitude sensors, and the memory device, has not been illustrated. It may take many and varied forms, depending upon what is to be accomplished. Thus, if it were only desired to confine the picture taking of an observation satellite to an area lying between two given latitudes, it would only be necessary to employ either one latitude sensor and a timing device, or two latitude sensors. In the first instance, the cell could be a photoelectric cell, connected to an amplifier-relay circuit, to start the timer which, in turn, would actuate the camera for a predetermined length of time, turn it off, and reset the system for re-energizing when the appropriate latitude is again reached. In the second case, the first latitude sensor to be energized can, by a similar simple photoelectric cell-amplifier-relay system, energize the camera, and the second of the latitude sensors to be energized can turn it off. Numerous equivalent electrical systems can be used, all of which are well known to those skilled in the art.

The longitude sensor circuitry, besides the standard electronic circuitry associated with a magnetometer of the saturable magnetic core type, may consist of comparison networks made up of resistor divider networks capable of multiplying electronically the magnetometer outputs by the sines and co-sines of the desired magnetic bearing angles, and differencing network which subsequently differences the component multiplications, to produce an electronically represented decision in the form of a discrete output.

There will, of course, be errors in the system of this invention, in the sense that it cannot be made to sense with absolute precision the latitude and longitude desired. However, for the most part, mechanical errors are small. It is calculated that the latitude error, leaving out of consideration the change in the sun's declination, will be approximately equivalent to the accuracy of the satellite's primary pitch stabilization system. The problem of the change in the sun's declination is somewhat more acute, particularly as the launch dates approach the vernal and autumnal equinoxes. However, this error is predictable with absolute certainty, and the experiment can be designed to take it into account. For example, with a launch date of May 6, and an experiment life of ten days, the device is preferably adjusted to produce 28 minutes error on the first day of the experiment, with the error decreasing linearly to zero at the half life of the experiment, and increasing again to 28 minutes on the tenth day. It can be seen, that by orienting the optical system equatorially, but, after launch, driving the cell 16 through the declination screw 17, the sun's declination can be compensated for. This, however, complicates the device. The reverse system, of orienting the optical system in the ecliptic plane and driving it equatorially to compensate for hold time and the precession of the nodes can also be employed, but, again, with undesirable complications.

Other variations, within the scope of the appended claims, will occur to those skilled in the art in the light of the foregoing disclosure. For example, in order to obtain greater precision it may be desirable in a light sensitive cell arrangement to use lens, prism or mirror systems or some combinations thereof, to produce a longer light path and greater definition than is obtainable in the embodiment shown. Other adjustment and mounting arrangements for the chamber may be used, and the shapes, construction and appearance of the various components may be varied widely.

Having thus described the invention, what is claimed and desired to be secured by Letters Patent is:

1. An orbiting vehicle location sensor comprising a chamber having an optical slit oriented through part of the travel of the vehicle toward the sun, and sun radiation sensitive means within said chamber and having an element positioned directly to receive radiation admitted through said optical slit at a particular orientation of the slit and chamber with respect to the sun, said sun radiation receiving element and a boundary of said optical slit defining a plane, the position of said chamber, being preset to orient a line perpendicular to said plane toward the North Star at said particular orientation of the slit and chamber with respect to the sun.

2. In combination with the device of claim 1, longitude sensing means connected to said radiation sensitive means to be energized by the action of the said radiation sensitive means when radiation from the sun, entering the optical slit, strikes said radiation sensitive means.

3. A stabilized orbiting vehicle location sensor comprising a chamber having a light-admitting slit oriented, at a predetermined latitude of the vehicle, toward the sun, photosensitive means including an element positioned in said chamber to receive directly light admitted by the said slit at a particular orientation of the slit and chamber with respect to the sun, a boundary of said slit and said light receiving element defining a plane, said chamber being oriented so that a line perpendicular to the plane defined by said slit boundary and element is parallel with the earth's polar axis at said predetermined latitude, and means for rotating said chamber about an axis parallel to the orbit angular momentum vector.

4. The sensor of claim 3 wherein adjustment means are provided to move the photosensitive means perpendicularly to the plane of the optical slit.

5. The sensor of claim 3 wherein orbit inclination adjustment means are provided for rotating the plane of the optical slit about a line perpendicular to the polar axis.

6. An orbiting vehicle location sensor comprising a chamber having an optical slit oriented at a predetermined latitude to admit light from the sun, light sensitive means positioned in said chamber to receive said light at said latitude, longitude sensing means, energized in response to the reception of light by said light sensitive means, a memory device containing a stored signal and comparing means operatively connected to said longitude sensing means and said memory device for determining, when said longitude sensing means is energized, whether a signal generated by said longitude sensing device is pertinent when compared against said stored signal.

7. A stabilized orbital vehicle location sensor comprising a chamber having a semicircular optical slit oriented, through part of the vehicle travel, as a result of the vehicle stabilization and vehicle position, toward the sun, and sun radiation sensitive means within said chamber and positioned to receive radiation admitted through said semicircular optical slit at a particular orientation of the slit and chamber with respect to the sun, one axis of said chamber, perpendicular to the plane of the semicircular optical slit, being preset to become oriented toward the North Star at said particular orientation of the slit and chamber with respect to the sun.

8. In combination with the device of claim 7, geomagnetic field sensing means connected to said radiation sensitive means to be energized by the action of said radiation sensing means when radiation, entering the semicircular optical slit, strikes the radiation sensitive means, and means, connected to said geomagnetic field sensing means, for comparing sensed magnetic strengths with stored preset values.

9. The sensor of claim 7 wherein adjustment means are provided to move the photosensitive means with respect to the plane of the semicircular optical slit.

10. The sensor of claim 7 wherein orbit inclination adjustment means are provided for rotating the plane of the optical slit about a line perpendicular to the polar axis.

11. The method of sensing the location of a stabilized orbiting vehicle carrying a latitude sensor with a chamber and an optical slit therein, comprising orienting said latitude sensor chamber with the plane of its optical slit parallel with the equatorial plane of the earth at a latitude predetermined before launch, positioning a radiation sensing element within said chamber to receive radiation from the sun through said optical slit at said predetermined latitude during a known portion of the duration of the vehicle's flight, and energizing a component of the vehicle, through the agency of said radiation sensing element, at each pass of the vehicle at said predetermined latitude.

12. In the method of claim 11, wherein the energized vehicle component is a longitude sensor comprised of magnetometers oriented to respond electrically to the geomagnetic field at the said predetermined latitude, the further step of comparing electronically on each vehicle pass, the electric response of said magnetometers with a stored response.

13. The method of claim 12 wherein, when the electric response of the magnetometers corresponds within limits to the said stored response, the said responses cause still another component of the vehicle to be actuated.

14. The sensor of claim 7 wherein means are provided for rotating said chamber about an axis parallel to the orbit angular momentum vector.

References Cited by the Examiner

UNITED STATES PATENTS

| | | | |
|---|---|---|---|
| 2,749,506 | 6/1956 | Emerson | 33—204.43 X |
| 2,847,642 | 8/1958 | Smith | 33—204.43 X |
| 3,025,023 | 3/1962 | Barghausen | 244—14 |

ISAAC LISANN, *Primary Examiner.*